United States Patent

[11] 3,632,160

[72] Inventor: Albert Schlapp, Sprendlingen, Germany
[21] Appl. No.: 877,103
[22] Filed: Nov. 17, 1969
[45] Patented: Jan. 4, 1972
[73] Assignee: Firma H. T. Golde GmbH, Frankfurt, Main, Germany
[32] Priority: Nov. 16, 1968
[33] Germany
[31] P 18 09 332.8

[54] SLIDING ROOF CONSTRUCTION FOR A MOTOR VEHICLE
5 Claims, 2 Drawing Figs.

[52] U.S. Cl. .................................................. 296/137 F, 49/250
[51] Int. Cl. .................................................. B60j 7/04
[50] Field of Search .................................................. 296/137; 49/248, 250, 388

[56] References Cited

UNITED STATES PATENTS

| | | | |
|---|---|---|---|
| 2,709,839 | 7/1955 | Nicoll | 49/248 |
| 3,033,608 | 5/1962 | Golde | 296/137 E |
| 3,497,909 | 3/1970 | Davis | 49/248 X |
| 3,507,537 | 4/1970 | Kouth et al. | 296/137 F |

FOREIGN PATENTS

| | | | |
|---|---|---|---|
| 1,328,938 | 4/1963 | France | 296/137 F |
| 2,008,697 | 1/1970 | France | 296/137 E |
| 1,085,317 | 9/1967 | Great Britain | 49/248 |

*Primary Examiner*—Benjamin Hersh
*Assistant Examiner*—Leslie J. Paperner
*Attorney*—McGlew and Toren ABSTRACT: A cover for a roof opening in a motor vehicle is supported on a pair of guide rails mounted on a frame attached to the interior surface of the roof. At its forward end on each of its longitudinally extending sides, the cover is secured by a pair of links and a slide member into the guide rails. The links which permit pivotal movement of the cover when it is displaced from its closed position, are spaced apart in the longitudinal direction of the guide rails with the forward link being shorter than the rearward link. When the cover is in the closed position the forward link is perpendicular to the guide rail while the rearward link forms an acute angle with the guide rail and converges toward the forward link as it extends toward the cover.

INVENTOR
ALBERT SCHLAPP
BY
ATTORNEYS

SLIDING ROOF CONSTRUCTION FOR A MOTOR VEHICLE

SUMMARY OF THE INVENTION

The invention is directed to a sliding cover for a roof opening in a motor vehicle and, more particularly, is concerned with the manner of attaching the forward end of the cover to a frame secured to the roof so that the cover can be displaced into a partially or fully opened position.

The invention relates to an improvement in a sliding roof construction for motor vehicles as disclosed in the copending application Ser. No. 746,616, filed July 22, 1968, now U.S. Pat. No. 3,507,537. In the copending application the rigid sliding cover is secured within an opening in a motor vehicle roof and is movably displaceable along guide rails which extend along the longitudinally extending sides of the roof. Each side of the cover has a forward and a rearward slide member connected to a cable located beneath the roof for moving the cover between its closed and opened positions. As indicated in the copending application, the sliding cover is displaceable from its closed position in the roof opening into a position where it acts as a ventilating flap and to a fully opened position where the cover is moved into a compartment formed below the roof and rearwardly of the roof opening. To move the cover from its closed into its opened positions the forward slide members are pivotally mounted about a horizontal axis which extends transversely to the sliding direction of the cover. In such an arrangement the pivotal connections for the cover at the forward slide members are located below the surface of the cover so that the front transverse edge of the cover pivots downwardly below the front edge of the roof opening. However, this construction presupposes that there is sufficient space for pivoting the front of the cover downwardly below the front edge of the roof. In the copending application a flange section attached to the roof is bent to 180° so that the frame connected to the flange affords sufficient room for the pivoting action.

To facilitate the formation of the opening in the roof and the attachment of the frame for the sliding roof cover about the opening, in many instances it is desirable to provide a flange about the opening which is disposed perpendicularly to the roof surface. At the rear transverse edge of the roof opening no 90° flange is used so that the cover can be moved into its storage compartment. However, with the perpendicularly arranged or 90° flange at the forward transverse edge of the opening it tends to interfere with the pivotal movement of the front transverse edge of the cover when it is being moved between the closed and opened positions. Based on the construction previously applied where a 90° flange is formed about the opening the cover would strike the flange as it is pivoted and cause the cover to be forced rearwardly. In turn, this would result in the rear transverse edge of the cover striking against the rear transverse edge of the roof opening, thereby obstructing the opening and closing action. Therefore, it is the primary object of the present invention to provide a pivotal connection for the cover so that as it is moved between the closed and opened positions it will not contact the perpendicular flange formed along the forward transverse edge of the roof opening. This problem could be solved by positioning the pivotal connections above the surface of the roof, however, such an arrangement is undesirable for both esthetic and decorative reasons. Another possible solution would be to provide a hingelike connection between the front edge of the roof opening and the front edge of the cover. Such a solution, however, is undesirable because of the arched or curved configuration of the roof in the direction transverse to the direction of travel of the motor vehicle. Because of the arched construction of the roof it would be possible to hinge the cover only at the centerline of the roof.

Therefore, in accordance with the present invention, the problem is solved by positioning the pivotal connections below the surface of the cover so that the cover can be pivoted without striking against the juxtaposed forward transverse edge of the roof opening. To provide the desired pivotal action for the cover the forward slide members located on each side of the cover are connected to the cover through a lever or link arrangement in which the levers are spaced apart and form two sides of a boxlike joint construction. In this joint construction the link closer to the forward transverse edge of the cover is shorter than the other link. Due to the positioning and ratio of lengths of the links the disadvantages previously experienced where a 90° or perpendicular flange is formed at the roof opening are overcome. Due to the arrangement of the links connecting the forward slide members on the cover the forward transverse edge of the cover is guided in such a manner that it does not come in contact with the flange about the roof opening but moves away from it during the opening movement because the front edge of the cover is displaced in a downward and a rearward direction. The maximum opening angle for the cover obtainable with this arrangement depends on the ratio of the lengths of the links and also on their geometrical arrangement. Advantageously, the links are arranged, when the cover is in its closed position, so that the shorter forward link extends between its points of connection to the cover and the slide member essentially perpendicular to the slide member, while the longer rearward link forms an acute angle with the slide member and converges with the forward link from its point of connection to the slide member to its point of connection to the cover. As a result, the distance between the connections of the links to the cover is smaller than the distance between the connections of the links to the slide member. Because of the difference in the lengths of the links and the oblique positioning of the rearward link, when the cover is being displaced there is no relative movement between it and the forward sliding member.

The pivotal connection between the cover and the forward slide members provides a flat construction which extends in a vertical direction due to the parallel arrangement of the imaginary connecting lines extending through the points of connection of the links to the cover and to the slide member.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE INVENTION

For purposes of simplifying the illustration of the invention only the forward portion of the roof cover is disclosed. The remainder of the roof construction is generally the same as shown in the above-mentioned copending application.

Figure 1:
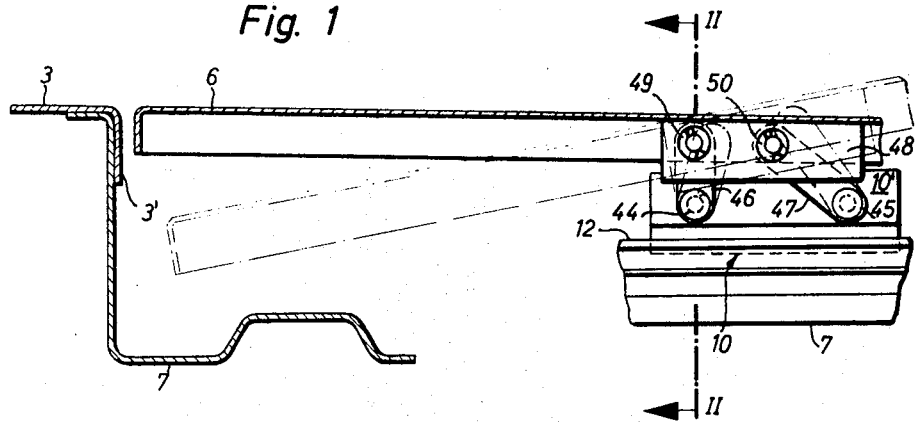
FIG. 1 is a longitudinal sectional view through a forward portion of a sliding roof construction for a motor vehicle embodying the present invention.
Figure 2:
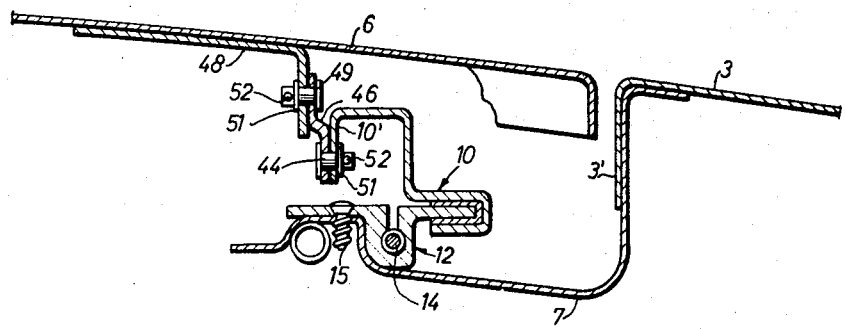
FIG. 2 is a partial sectional view taken along line II—II in FIG. 1.

In FIGS. 1 and 2 the forward portion of a motor vehicle roof 3 is disclosed having an opening containing a sliding cover 6 which is shown in the closed position in FIGS. 1 and 2. A frame 7 is secured to the roof and forms both a reinforcement for the opening in the roof and a rain gutter extending about and below the opening. On each of the longitudinally extending sides of the cover adjacent its forward transverse edge is a slide member 10. Each slide member 10 is secured to a guide rail 12 which is attached to the frame 7 by means of screws 15, see FIG. 2. Further, in FIG. 2, a cable 14 is positioned in the guide rail for cooperating in the displacement of the cover between its closed and opened positions. Both of the figures indicate a view of the pivotal interconnection between the cover 7 and the slide member 10 which will be described in detail hereinafter.

In each of the figures a flange 3' is shown extending downwardly from the roof and is positioned perpendicularly or at 90° to the roof surface. In FIG. 1 the flange 3' disposed across the forward edge of the roof opening is shown and the pivotal arrangement of the cover 6 disclosed herein is directed to moving the cover between its opened and closed positions without any contact between the forward transverse edge of the cover 6 and the juxtaposed transverse edge of the opening. In the drawing, the pivotal interconnection between the cover and the slide member is shown for one side of the roof construction, however, it will be appreciated since the roof construction on one side of the longitudinal axis is a mirror image of the one on the opposite side the other pivotal connection is constructed in the same manner.

As illustrated best in FIG. 2, the slide member 10 has a vertically arranged leg 10' in which two bearing or connecting bolts 45, 46 are mounted. The bolt 44 secures a forward link 46 to the slide member 10, that is, as shown in FIG. 1, the forward link is the one closer to the forward transverse edge of the opening in the roof 3. Similarly, the bolt 45 secures a rearward link 47 to the slide member 10 and, as can be noted in the drawing, the forward link 46 is shorter than the rearward link 47. On the underside of the cover 6 the horizontal leg of an angle 48 is secured to the cover and its vertical leg extends downwardly toward the slide member. The upper end of the forward link 46 is connected to the vertical leg of the angle by a connecting or bearing bolt 49 and spaced rearwardly from the bolt 49 another connecting or bearing bolt 50 secures the upper end of the rearward link to the vertical leg of the angle. Adjusting means, not shown, can be positioned between the horizontal leg of the angle 48 and the cover 6 for affording any level or height adjustment for the cover 6 relative to the roof 3.

As indicated in the drawing, the links 46 and 47 are secured to the leg 10' of the slide member 10 and to the vertical leg of the angle 48 by means of supporting discs 51 and split pins 52 fitted on the bolts 44, 45, 49 and 50. However, the bolts may be secured in other conventional ways as long as they are capable of providing the requisite pivoting action for the cover. As is illustrated by the link 46 in FIG. 2, each of the links 47 and 48 has an offset section intermediate its ends so that the opposite ends of the links are disposed in offset parallel relationship to one another. This offset arrangement of the links is provided to avoid any obstruction by the bearing bolts to the pivotal movement of the links.

In FIGS. 1 and 2 the cover 6 is shown in full line in the closed position and in dot-dash lines in an open position. As indicated by the dot-dash lines in FIG. 1, when the cover is displaced from its closed to its opened position the forward and rearward links 46, 47 pivot about their respective bearing bolts 44 and 45 in the clockwise direction and, similarly, when the cover is being moved from the opened to the closed position the links pivot in the opposite direction.

In the drawing a gap appears between the edges of the cover and the juxtaposed flanges 3' of the roof, however, these gaps are, in fact, closed by means of known sealing strips which are secured to the flanges of the cover.

In the closed position the forward link 46 extends perpendicularly to the slide member 10. Further, an imaginary line extending between the points of connection of the links to the cover and between the points of connection of the links to the slide member are disposed in parallel relationship and since the rearward link 47 is longer than the forward link it is arranged so that it converges toward the forward link as it proceeds from the slide member. Because of this arrangement, when the cover 6 is moved from its closed to its opened position it does not contact the juxtaposed surface of the roof opening.

I claim:

1. A roof construction for a motor vehicle body comprising a roof having an opening therein, a frame secured to said roof and extending about and downwardly from the opening in said roof; said frame having a pair of oppositely disposed sides extending in the longitudinal direction of said roof; a pair of guide rails supported by said frame and each of said guide rails extending along one of said longitudinally extending sides; a cover mounted on and slidably positionable along said frame in the direction of said longitudinally extending sides, said cover having a forward edge and a rearward edge each extending transversely of the longitudinal direction of said roof; means including forward slide members for interconnecting said cover and said guide rails for displacing said cover rearwardly in the longitudinally direction of the roof for at least partially removing said cover from the opening in said roof, said forward slide members located below and interconnected to said cover along the longitudinally extending sides thereof adjacent the forward edge of said cover, wherein the improvement is characterized in that said means comprises linking means interconnecting said cover and said forward slide members, said linking means for connecting one said forward slide member to said cover comprising a first link and a second link, each of said first and second links are articulated at one end thereof to said forward slide member and extend upwardly therefrom and are articulated at the other end thereof to said cover, said second link spaced rearwardly in the longitudinally direction of said roof from said first link and said second link being longer than said first link so that first and second links form two sides of a boxlike joint connection between said cover and said forward slide member, wherein when said cover completely closes the opening in said roof said first link extends perpendicularly to said forward slide member and said second link forms an acute angle with said forward slide member and is arranged in converging relationship with said first link from their points of attachment to said forward slide member to their points of attachment to said cover.

2. A roof construction, as set forth in claim 1, wherein when said cover completely closes the opening in said roof a line connecting the points of attachment of said first and second links to said cover is in parallel relationship with a line connecting the points of attachment of said first and second links to said forward slide member.

3. A roof construction, as set forth in claim 1, wherein with said cover in the closed position in said frame, a line through the center of the points of connection of said first and second links to said cover is in parallel relationship with another line through the centers of the points of connection of said first and second links to said forward slide member.

4. A roof construction, as set forth in claim 3, wherein the opposite ends of said first and second links attached to said cover and said forward slide member respectively are in offset parallel relationship.

5. A roof construction, as set forth in claim 3, wherein a flange is secured to and extends downwardly from said roof and defines the opening therein, said flange is arranged perpendicularly to said roof, and said frame is attached to and extends downwardly from said flange.

* * * * *